(12) United States Patent
Hayashi

(10) Patent No.: US 9,541,704 B2
(45) Date of Patent: Jan. 10, 2017

(54) MULTI-CORE OPTICAL FIBER AND MULTI-CORE OPTICAL FIBER CABLE

(71) Applicant: SUMITOMO ELECTRIC INDUSTRIES, LTD., Osaka-shi, Osaka (JP)

(72) Inventor: Tetsuya Hayashi, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 201 days.

(21) Appl. No.: 14/409,698

(22) PCT Filed: Jun. 20, 2014

(86) PCT No.: PCT/JP2014/066456
§ 371 (c)(1),
(2) Date: Dec. 19, 2014

(87) PCT Pub. No.: WO2015/001990
PCT Pub. Date: Jan. 8, 2015

(65) Prior Publication Data
US 2016/0266307 A1 Sep. 15, 2016

(30) Foreign Application Priority Data
Jul. 4, 2013 (JP) ................................ 2013-140736

(51) Int. Cl.
*G02B 6/44* (2006.01)
*G02B 6/02* (2006.01)

(52) U.S. Cl.
CPC ....... *G02B 6/02042* (2013.01); *G02B 6/02395* (2013.01); *G02B 6/4413* (2013.01)

(58) Field of Classification Search
None
See application file for complete search history.

(56) References Cited

U.S. PATENT DOCUMENTS 8,406,595 B2    3/2013   Hayashi

FOREIGN PATENT DOCUMENTS

| JP | 61-026005 A | 2/1986 |
|----|-------------|--------|
| JP | 2005-164714 A | 6/2005 |

(Continued)

OTHER PUBLICATIONS

English-language translation of International Preliminary Report on Patentability (IPRP) dated Jan. 14, 2016 that issued in WO Patent Application No. PCT/JP2014/066456.

(Continued)

*Primary Examiner* — Eric Wong
(74) *Attorney, Agent, or Firm* — Drinker Biddle & Reath LLP

(57) ABSTRACT

The present embodiment relates to a multi-core optical fiber and others having an excellent transmission capacity per unit cross-sectional area and spectral efficiency and being easy to manufacture. The multi-core optical fiber has a plurality of cores, a cladding, and a coating and has an appropriately-set neighboring core pitch, cable cutoff wavelength, confinement index of light into each core, cladding outer diameter, and neighboring intercore power coupling coefficient, and a relationship among a minimum of Formula $\Lambda/(r_{clad}-OCT_{min})$, a maximum of the Formula, and a core count is present under a predetermined relationship.

9 Claims, 16 Drawing Sheets

(56) References Cited

FOREIGN PATENT DOCUMENTS

| JP | 2011-170336 A | 9/2011 |
| JP | 2011-197661 A | 10/2011 |
| JP | 2013-092801 A | 5/2013 |
| WO | WO-2012/026473 A1 | 3/2012 |

OTHER PUBLICATIONS

M. Tanaka et al., "Wavelength Dependences of Crosstalk in Multi-Core Fiber," IEICE Society Conference Koen Ronbunshu 2, Aug. 30, 2011, pp. 241.

T. Hayashi et al., "Crosstalk variation of multi-core fibre due to fibre bend," Eur. Conf. Opt. Commun. (ECOC), 2010, 2010, pp. We.8.F.6.

M. Koshiba et al., "Analytical expression of average power-coupling coefficients for estimating intercore crosstalk in multicore fibers," IEEE Photon. J., vol. 4, No. 5, Oct. 2012, pp. 1987-1995.

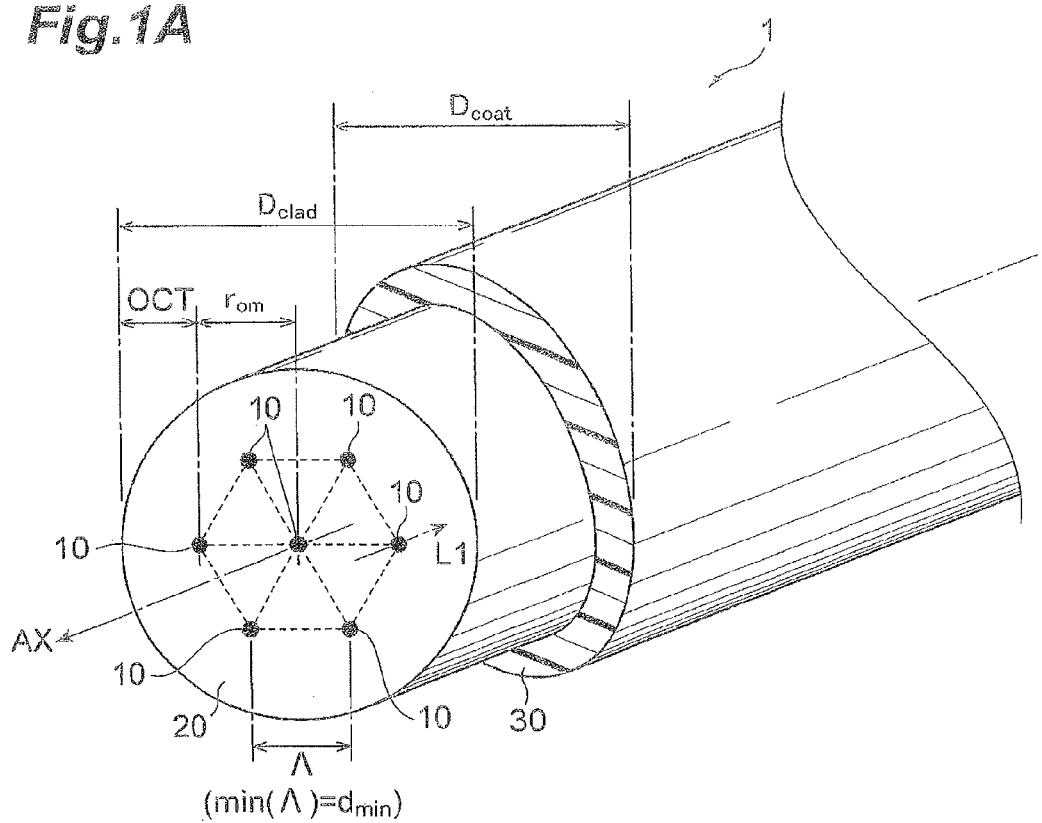
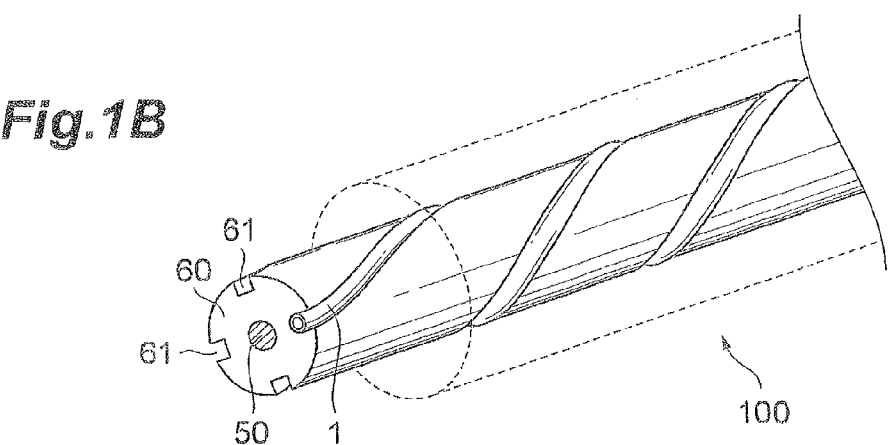

Fig.6

| MINIMUM OF $d_{min}/r_{om}$ | MAXIMUM OF $d_{min}/r_{om}$ | CORE COUNT |
|---|---|---|
| 0.868 | 1.000 | 7 |
| 0.618 | 0.655 | 12 |
| 0.485 | 0.500 | 19 |
| 0.368 | 0.378 | 31 |
| 0.271 | 0.277 | 55 |

Fig.7

| MINIMUM OF $d_{min}/r_{om}$ | MAXIMUM OF $d_{min}/r_{om}$ | CORE COUNT |
|---|---|---|
| 0.868 | 1.000 | 7 |
| 0.618 | 0.655 | 12 |
| 0.470 | 0.500 | 19 |
| 0.389 | 0.397 | 27 |
| 0.365 | 0.378 | 31 |
| 0.304 | 0.311 | 42 |
| 0.266 | 0.277 | 55 |
| 0.234 | 0.240 | 69 |
| 0.210 | 0.218 | 85 |
| 0.174 | 0.180 | 121 |

Fig.8

| MINIMUM OF $d_{min}/r_{om}$ | MAXIMUM OF $d_{min}/r_{om}$ | CORE COUNT |
|---|---|---|
| 0.868 | 1.000 | 7 |
| 0.601 | 0.655 | 12 |
| 0.450 | 0.500 | 19 |
| 0.378 | 0.397 | 27 |
| 0.351 | 0.378 | 31 |
| 0.315 | 0.333 | 37 |
| 0.297 | 0.311 | 42 |
| 0.278 | 0.285 | 48 |
| 0.255 | 0.277 | 55 |
| 0.240 | 0.248 | 63 |
| 0.229 | 0.240 | 69 |
| 0.222 | 0.229 | 73 |
| 0.203 | 0.218 | 85 |
| 0.189 | 0.195 | 102 |
| 0.182 | 0.189 | 109 |
| 0.173 | 0.180 | 121 |
| 0.154 | 0.160 | 151 |

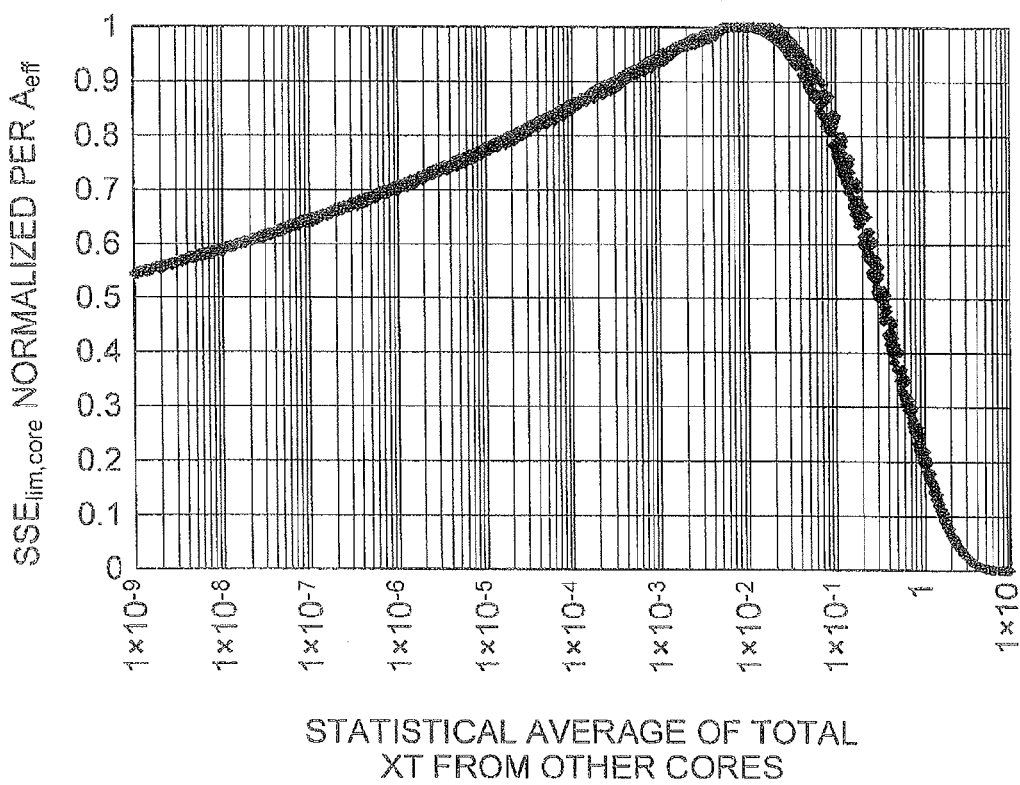

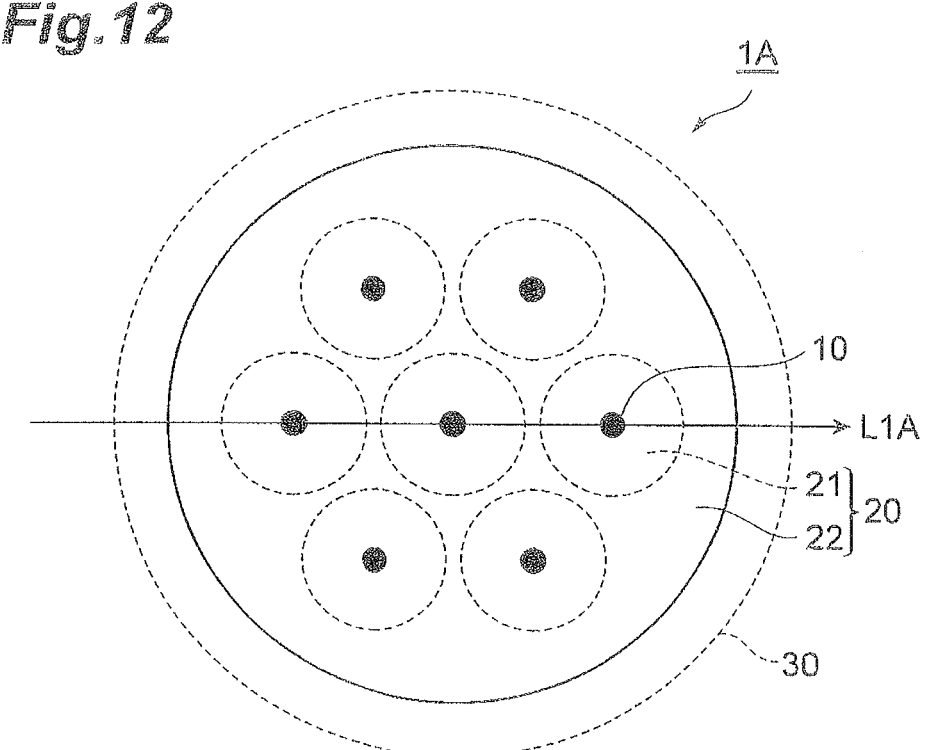

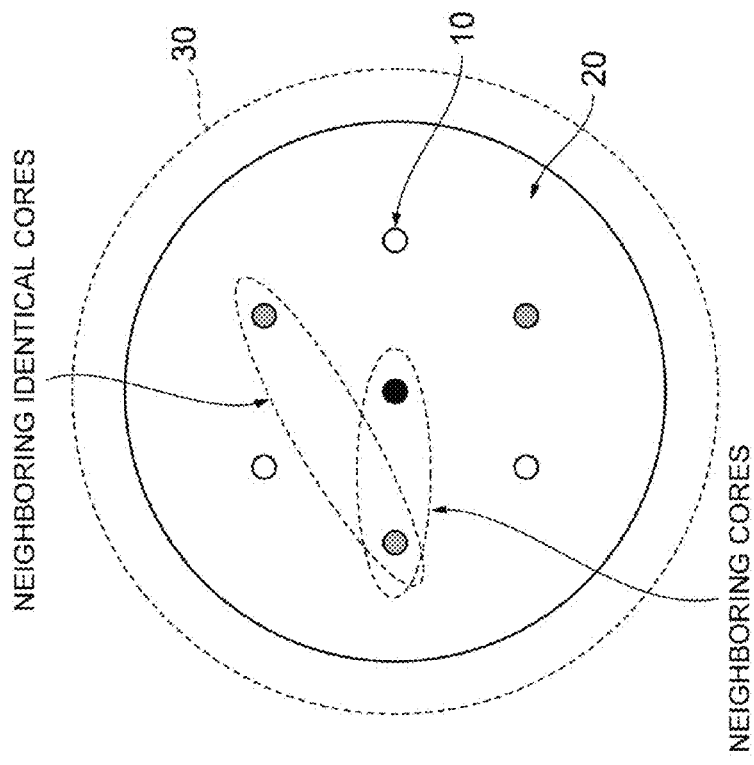
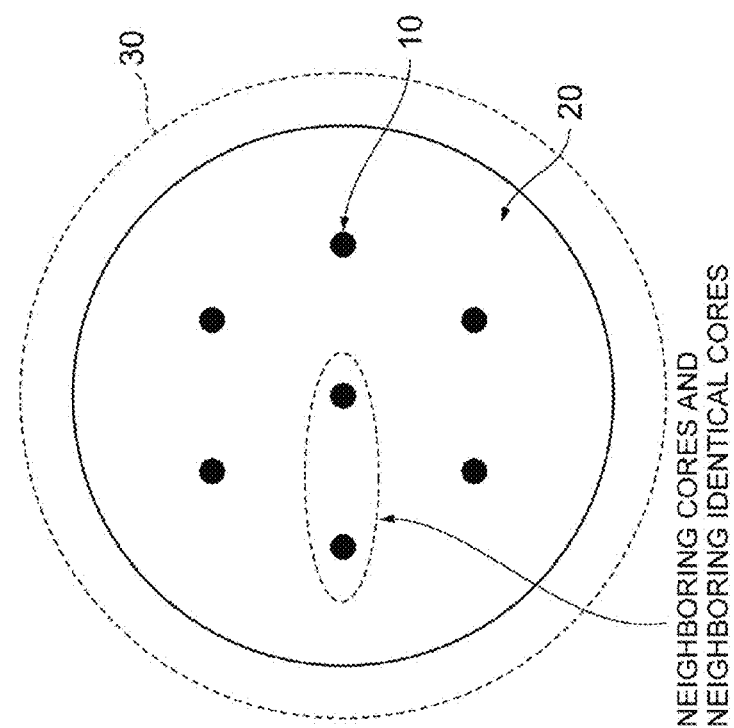

MULTI-CORE OPTICAL FIBER AND MULTI-CORE OPTICAL FIBER CABLE

TECHNICAL FIELD

The present embodiment relates to a multi-core optical fiber and a multi-core optical fiber cable.

BACKGROUND ART

A multi-core optical fiber has a plurality of cores extending along the fiber axis in a common cladding. There are needs for improvement in transmission capacity per unit cross-sectional area in the multi-core optical fiber.

CITATION LIST

Patent Literature

Patent Literature 1: Japanese Patent Application Laid-open Publication No. 2011-170336

Non Patent Literature

Non Patent Literature 1: T. Hayashi, T. Nagashima, O. Shimakawa, T. Sasaki, and E. Sasaoka, "Crosstalk variation of multi-core fibre due to fibre bend," in Eur. Conf. Opt. Commun. (ECOC), 2010, We.8.F.6.

SUMMARY OF INVENTION

Technical Problem

The Inventor conducted detailed research on the conventional multi-core optical fiber and found the problem as described below.

Namely, the foregoing Patent Literature 1 and Non Patent Literature 1 describe the study on the relationship between desired optical characteristics and crosstalk and the core constellations in a cross section of the fiber, in order to increase the transmission capacity per unit cross-sectional area in the multi-core optical fiber. However, they fail to achieve optimization from the viewpoint of the transmission capacity per unit cross-sectional area and spectral efficiency while also taking account of manufacturing easiness of the multi-core optical fiber.

The present embodiment has been accomplished in order to solve the above problem and it is an object thereof to provide a multi-core optical fiber and a multi-core optical fiber cable having an excellent transmission capacity per unit cross-sectional area and spectral efficiency and being easy to manufacture.

Solution to Problem

A multi-core optical fiber according to the present embodiment comprises: a plurality of cores each extending along a central axis and comprised of silica-based glass; a common cladding covering each of the plurality of cores and comprised of silica glass; and a coating provided on an outer peripheral surface of the cladding and comprised of a material different from silica glass.

Particularly, in a first aspect of the present embodiment, in a cross section of the multi-core optical fiber perpendicular to the central axis, the plurality of cores are arranged in an equilateral-triangular lattice pattern and a neighboring core pitch $\Lambda$ [µm] being a distance between centers of neighboring cores is constant. A cable cutoff wavelength $\lambda_{cc}$ [µm] of each of the plurality of cores is not more than 1.53 µm. When a theoretical cutoff wavelength is represented by $\lambda_{cth}$[µm] and a mode field diameter by MFD [µm], $MFD/(\lambda_{cc})^{0.657}$ as a confinement index of light into each of the plurality of cores is not more than 8.2 at the wavelength of 1.55 µm, or, $MFD/(\lambda_{cth})^{0.720}$ as a confinement index of light into each of the plurality of cores is not more than 6.9 at the wavelength of 1.55 µm. An outer diameter $2r_{clad}$ [µm] of the common cladding is from 115 µm to 250 µm. When the multi-core optical fiber is bent in a radius of curvature R in the range of 0.3 m to 3 m over the entire length thereof, both of a neighboring intercore power coupling coefficient and a neighboring identical intercore power coupling coefficient are not more than $2.3 \times 10^{-6}$/km at the wavelength of 1625 nm and at least either one of the neighboring intercore power coupling coefficient and the neighboring identical intercore power coupling coefficient is not less than $3.6 \times 10^{-9}$/km at the wavelength of 1530 nm. When OCT represents a shortest distance from a center of a core located at an outermost periphery out of the plurality of cores, to an outer peripheral surface of the common cladding, each of $OCT_{0.01\ dB/km}$ [µm] by which a transmission loss increase in the coating theoretically becomes 0.01 dB/km and $OCT_{0.001\ dB/km}$ [µm] by which the transmission loss increase in the coating theoretically becomes 0.001 dB/km, is a value obtained by Formula (1) or Formula (2) below using MFD [µm] at the wavelength of 1625 µm. When permissible minimum OCT is represented by $OCT_{min}$, the $OCT_{min}$ is a value from $OCT_{0.01\ dB/km}$ to $OCT_{0.001\ dB/km}$ and actual OCT is not less than $OCT_{min}$. Furthermore, with a definition of a parameter represented by a formula of $\Lambda/(r_{clad}-OCT_{min})$ which is a ratio of the neighboring core pitch $\Lambda$ to a core-arrangeable radius of the common cladding, a relationship of [a core count:a minimum of the parameter:a maximum of the parameter] is one of [19:0.450:0.500], [27:0.378:0.397], [31:0.351:0.378], [37:0.315:0.333], [42:0.297:0.311], [48:0.278:0.285], [55:0.255:0.277], [63:0.240:0.248], [69:0.229:0.240], [73:0.222:0.229], [85:0.203:0.218], [102:0.189:0.195], [109:0.182:0.189], [121:0.173:0.180], and [151:0.154:0.160].

$$\begin{cases} OCT_{0.01\ dB/km} = 1.625\left[-7.78 \times 10^{-2}\left(\frac{MFD}{(\lambda_{bc})^{0.869}}\right)^2 + 3.02\left(\frac{MFD}{(\lambda_{bc})^{0.869}}\right)\right] \\ OCT_{0.001\ dB/km} = 1.625\left[-8.48 \times 10^{-2}\left(\frac{MFD}{(\lambda_{cc})^{0.869}}\right)^2 + 3.31\left(\frac{MFD}{(\lambda_{cc})^{0.869}}\right)\right] \end{cases} \quad (1)$$

$$\begin{cases} OCT_{0.01\ dB/km} = 1.625\left[-2.90 \times 10^{-2}\left(\frac{MFD}{(\lambda_{cth})^{0.703}}\right)^2 + 2.81\left(\frac{MFD}{(\lambda_{cth})^{0.703}}\right)\right] \\ OCT_{0.001\ dB/km} = 1.625\left[-3.06 \times 10^{-2}\left(\frac{MFD}{(\lambda_{cth})^{0.703}}\right)^2 + 3.08\left(\frac{MFD}{(\lambda_{cth})^{0.703}}\right)\right] \end{cases} \quad (2)$$

As a second aspect applicable to the foregoing first aspect, preferably, when the multi-core optical fiber is bent in the radius of curvature R in the range of 0.3 m to 3 m over the entire length thereof, both of a neighboring different intercore power coupling coefficient and the neighboring identical intercore power coupling coefficient are not more than $1.1 \times 10^{-6}$/km at the wavelength of 1625 nm and at least either one of the neighboring different intercore power coupling coefficient and the neighboring identical intercore power coupling coefficient is not less than $5.3 \times 10^{-8}$/1 cm at the wavelength of 1530 nm.

As a third aspect applicable to at least either one of the foregoing first and second aspects, pairs of neighboring cores among the plurality of cores preferably include a pair of identical cores. Furthermore, in a use condition that an average along a longitudinal direction of the multi-core optical fiber, of the radius of curvature R [m] thereof is not less than 0.3 m, when the wavelength is represented by $\lambda$ [μm], an effective refractive index is represented by $n_{eff}$, a core pitch between neighboring identical cores is represented by $\Lambda_{identical}$ [μm], a minimum $\eta_{min}$ of the effective refractive index $n_{eff}$ is 3.6×10$^{-9}$/km, a maximum $\eta_{max}$ of the effective refractive index $n_{eff}$ is 2.3×10$^{-6}$/km, and an effective radius of curvature $R_{eff,\lambda}$ is defined by Formula (3) below, $\Lambda_{identical}$ [μm] preferably satisfies a first condition or a second condition. The first condition is a condition that $\Lambda_{identical}$ [μm] satisfies Formula (4) below at $\lambda$=1.53 μm and satisfies Formula (5) below at $\lambda$=1.625 μm. The second condition is a condition that $\Lambda_{identical}$ [μm] satisfies Formula (6) below at $\lambda$=1.53 μm and satisfies Formula (7) below at $\lambda$=1.625 μm.

$$R_{eff,\lambda} = \left\{\left[\frac{\lambda}{2\pi n_{eff}\Lambda_{identical}0.05}\right]^2 + \frac{1}{R^2}\right\}^{-\frac{1}{2}} \quad (3)$$

$$\Lambda_{identical} \leq \lambda\left[-2.99\times10^{-3}(32.1 + \ln R_{eff,\lambda} - \ln \eta_{min})\left(\frac{MFD}{(\lambda_{cth})^{0.657}}\right)^2 + \right.$$
$$\left.1.17\times10^{-1}(26.7 + \ln R_{eff,\lambda} - \ln \eta_{min})\left(\frac{MFD}{(\lambda_{cth})^{0.657}}\right)\right] \quad (4)$$

$$\Lambda_{identical} \geq \lambda\left[-2.99\times10^{-3}(32.1 + \ln R_{eff,\lambda} - \ln \eta_{max})\left(\frac{MFD}{(\lambda_{cth})^{0.657}}\right)^2 + \right.$$
$$\left.1.17\times10^{-1}(26.7 + \ln R_{eff,\lambda} - \ln \eta_{max})\left(\frac{MFD}{(\lambda_{cth})^{0.657}}\right)\right] \quad (5)$$

$$\Lambda_{identical} \leq \lambda\left[-1.47\times10^{-3}(44.9 + \ln R_{eff,\lambda} - \ln \eta_{min})\left(\frac{MFD}{(\lambda_{cth})^{0.720}}\right)^2 + \right.$$
$$\left.1.18\times10^{-1}(27.0 + \ln R_{eff,\lambda} - \ln \eta_{min})\left(\frac{MFD}{(\lambda_{cth})^{0.720}}\right)\right] \quad (6)$$

$$\Lambda_{identical} \geq \lambda\left[-1.47\times10^{-3}(44.9 + \ln R_{eff,\lambda} - \ln \eta_{max})\left(\frac{MFD}{(\lambda_{cth})^{0.720}}\right)^2 + \right.$$
$$\left.1.18\times10^{-1}(27.0 + \ln R_{eff,\lambda} - \ln \eta_{max})\left(\frac{MFD}{(\lambda_{cth})^{0.720}}\right)\right] \quad (7)$$

As a fourth aspect applicable to at least any one of the foregoing first to third aspects, all the plurality of cores are preferably identical cores.

As a fifth aspect applicable to at least any one of the foregoing first to fourth aspects, when at the wavelength of 1.55 μm a desired relationship among the core count, an upper limit of MFD/$(\lambda_{cc})^{0.657}$, and an upper limit of MFD/$(\lambda_{cth})^{0.720}$ with variation of the core count between 27 and 55 is described in the form of [the core count, the upper limit of MFD/$(\lambda_{cc})^{0.657}$, and the upper limit of MFD/$(\lambda_{cth})^{0.720}$], [the core count, the upper limit of MFD/$(\lambda_{cc})^{0.657}$, and the upper limit of MFD/$(\lambda_{cth})^{0.720}$] is preferably one of [27, 6.4, 5.6], [31, 6.1, 5.4], [37, 5.4, 4.8], [42, 5.1, 4.6], [48, 4.7, 4.2], and [55, 4.6, 4.1].

As a sixth aspect applicable to at least any one of the foregoing first to fifth aspects, the common cladding includes a plurality of optical claddings each of which is a region in contact with a corresponding core out of the plurality of cores and contributes to propagation of light in the corresponding core. Furthermore, pairs of neighboring cores among the plurality of cores include one or more pairs of neighboring different cores comprised of different cores different in at least one of a core diameter, a relative refractive-index difference between the core and the optical cladding, and a refractive index of the optical cladding. In this regard, a core pitch between the neighboring different cores is preferably smaller than the core pitch $\Lambda_{identical}$ between the neighboring identical cores.

As a seventh aspect applicable to at least any one of the foregoing first to sixth aspects, the radius of curvature R of a bend of the multi-core optical fiber with which crosstalk between neighboring different cores becomes maximum among all the pairs of neighboring different cores, is preferably less than 0.3 m.

A multi-core optical fiber cable according to the present embodiment comprises the multi-core optical fiber according to any one of the first to sixth aspects. Particularly, as to the multi-core optical fiber, the multi-core optical fiber is incorporated in a state in which an average of the radius of curvature R along the longitudinal direction thereof is maintained not less than 0.3 m.

On the other hand, the multi-core optical fiber cable according to the present embodiment may comprise any one of the first, second, and fourth to seventh aspects. In this case, as to the multi-core optical fiber, the multi-core optical fiber is incorporated in a state in which the average of the radius of curvature R along the longitudinal direction thereof is maintained not more than 3 m.

Advantageous Effect of Invention

The multi-core optical fiber according to the present embodiment is easy to manufacture and has an excellent transmission capacity per unit cross-sectional area and spectral efficiency.

BRIEF DESCRIPTION OF DRAWINGS

FIGS. 1A and 1B are views respectively showing a cross-sectional structure of a multi-core optical fiber 1 and an internal structure of a multi-core optical fiber cable 100.

FIG. 6 is a table collectively showing the ranges of d$_{min}$/r$_{om}$ for the core count ratio of 1 and the core counts in hexagonal packing in the corresponding ranges.

FIG. 7 is a table collectively showing the ranges of d$_{min}$/r$_{om}$ for the core count ratios of not less than 0.95 and the core counts in hexagonal packing in the corresponding ranges.

FIG. 8 is a table collectively showing the ranges of d$_{min}$/r$_{om}$ for the core count ratios of not less than 0.9 and the core counts in hexagonal packing in the corresponding ranges.

FIG. 11 is a graph showing a relationship of $SSE_{lim,core}$ normalized per $A_{\mathit{eff}}$ with a statistical average $(XT_{total})$ of total crosstalk from the other cores.

FIG. 12 is a drawing showing a cross section of a multi-core optical fiber 1A.

FIGS. 16A and 16B are views showing relationships of neighboring cores in a case of only identical cores and in a case of multiple types of cores, in the cross section of the multi-core optical fiber 1.

DESCRIPTION OF EMBODIMENTS

Figure 2:
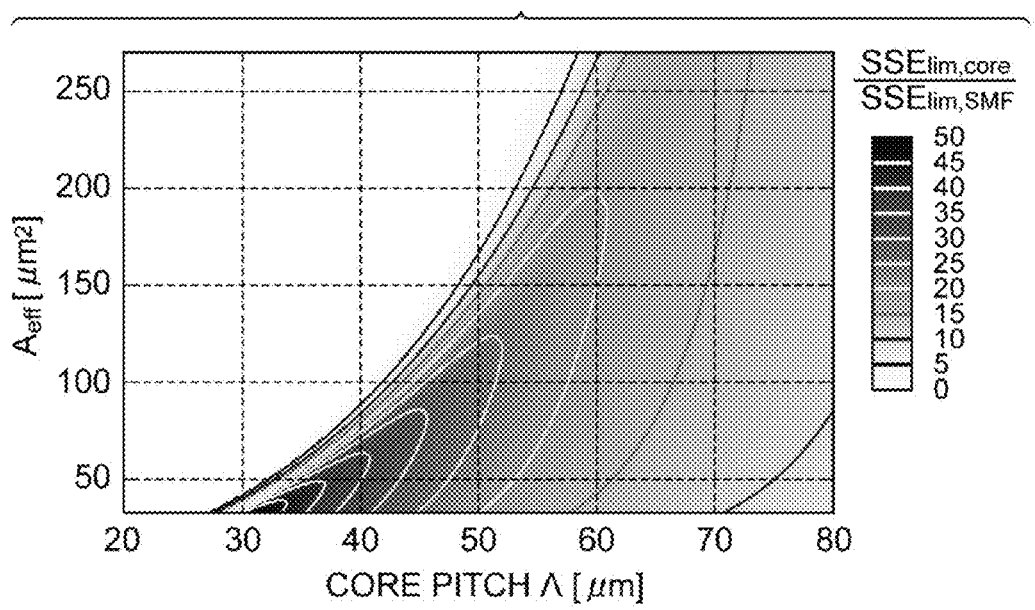
FIG. 2 is a graph showing dependence of a ratio (SSE$_{lim,core}$/SSE$_{lim,SMF}$) on an effective cross-sectional area A$_{eff}$ and a core pitch $\Lambda$ of step-index cores.

The present embodiment will be described below in detail with reference to the accompanying drawings. The same elements will be denoted by the same reference signs in the description of the drawings, without redundant description.

FIG. 1A is a drawing showing the cross-sectional structure of the multi-core optical fiber 1. In FIG. 1A, the multi-core optical fiber 1 has a plurality of cores 10 each extending along the fiber axis (the central axis of the multi-core optical fiber 1), a common cladding 20 (which will be referred to hereinafter simply as cladding) covering each of the plurality of cores 10, and a coating 30 provided around the outer periphery of the common cladding 20. FIG. 1A shows the example wherein the core count is seven. In the fiber cross section of FIG. 1A, six cores 10 are arranged around one core 10 located at the center (position of an intersection with the fiber axis AX). Namely, in the fiber cross section of FIG. 1A, the seven cores 10 are arranged in an equilateral-triangular lattice pattern. Each of the plurality of cores 10 has the refractive index higher than that of the common cladding 20. The cores 10 and cladding 20 are comprised of silica glass and, the cores 10 or the cladding 20 is doped with an impurity for adjustment of refractive index. The coating is comprised of a material other than silica glass, e.g., resin or the like.

FIG. 1B is a drawing showing the internal structure of the multi-core optical fiber cable 100. In the example of FIG. 1B, a slotted rod 60 for holding the foregoing multi-core optical fiber 1 in a bent state in a predetermined radius of curvature R is kept in a cable jacket (which is indicated by broken lines in the drawing). The slotted rod 60 is comprised of a material other than silica glass, e.g., resin, and a tension member 50 is arranged in its center. Slots 61 are formed in a spiral way along the longitudinal direction of the tension member 50 in the surface of the slotted rod 60 and the aforementioned multi-core optical fiber 1 is set in the slot 61, whereby the multi-core optical fiber 1 becomes bent in the predetermined radius of curvature R. The structure for bending the multi-core optical fiber 1 in the predetermined radius of curvature R does not always have to be limited solely to the slotted rod 60. The bend in the radius of curvature R can also be achieved by arrangement other than the spiral arrangement.

In order to maximize the transmissible capacity in the multi-core optical fiber 1, it is desirable to increase a space-frequency utilization efficiency (SSE: spatial spectral efficiency) which is a value obtained by dividing the sum of frequency utilization efficiencies (SE: spectral efficiency) of respective spatial channels (respective cores) by a fiber cross-sectional area $A_{cs}$. SSE is defined by Formula (8) below.

$$SSE \propto \frac{\Sigma SE}{A_{cb}} \quad (8)$$

SE of each spatial channel cannot be unlimitedly increased. SE of each spatial channel becomes maximum when noise of optical amplifier and noise due to nonlinear optical phenomena are minimized. An upper limit of the spectral efficiency SE of each spatial channel will be represented by $SE_{lim}$. An upper limit of the spatial spectral efficiency SSE is expressed by Formula (9) below.

$$SSE_{lim} \equiv \frac{\Sigma SE_{lim}}{A_{cb}} \quad (9)$$

The Inventor conducted the following research based on the above definitions. Let $SSE_{lim,core}$ be $SSE_{lim}$ in a situation wherein cores are arranged in the equilateral-triangular lattice pattern on an infinitely-spreading plane, with no consideration to the diameter and shape of the optical fiber. $SSE_{lim,core}$ is defined by Formula (10) below. In this formula, $\Lambda$ stands for the distance between centers of neighboring cores (which will be referred to hereinafter simply as core pitch). $SSE_{lim,core}$ can be used as a potential index of SSE which can be realized with use of the cores. $SSE_{lim,core}$ varies depending upon the core shape and refractive index profile.

$$SSE_{lim,core} \equiv \frac{\Sigma_{core} SE_{lim}}{\Lambda^2 \sqrt{3}/2} \quad (10)$$

For example, a ratio $(SSE_{lim,core}/SSE_{lim,SMF})$ was determined as a ratio of $SSE_{lim,core}$ in step index cores with the cable cutoff wavelength of 1530 nm to $SSE_{lim,SMF}$ of a general-purpose single-mode fiber with the effective cross-sectional area $A_{\mathit{eff}}$ of 80 μm² at the wavelength of 1550 nm and with the cable cutoff wavelength of 1260 nm (which was calculated by the foregoing Formula (10) using the coating diameter of 250 μm as $\Lambda$), and dependence of the ratio $(SSE_{lim,core}/SSE_{lim,SMF})$ on the effective cross-sectional area $A_{\mathit{eff}}$ and the core pitch $\Lambda$ of step-index cores was investigated. FIG. 2 is a graph showing the dependence of the ratio $(SSE_{lim,core}/SSE_{lim,SMF})$ on the effective cross-sectional area $A_{\mathit{eff}}$ and the core pitch $\Lambda$ of step-index cores. The calculation herein was done on the assumption of the transmission loss of 0.18 dB/km, average fiber curvature radius of 1 m, noise figure of optical amplifiers of 6 dB, distance between optical amplifiers of 80 km, and total transmission link length of 3200 km. The reason why $SSE_{lim,core}$ becomes almost 0 with $\Lambda$ being too small is that the intercore crosstalk becomes too large.

In spite of use of the simple step-index type cores, $SSE_{lim,core}$ can be not less than 30 times $SSE_{lim,SMF}$ when $A_{\mathit{eff}}$ of the step-index cores is not more than about 87 μm². When $A_{\mathit{eff}}$ of the step-index cores is not more than about 64 μm², $SSE_{lim,core}$ can be not less than 35 times $SSE_{lim,SMF}$.

Furthermore, when $A_{eff}$ of the step-index cores is not more than about 50 μm², $SSE_{lim,core}$ can be not less than 40 times $SSE_{lim,SMF}$.

When MFD/$(\lambda_{cc})^{0.657}$ expressed by the cable cutoff wavelength $\lambda_{cc}$ [μm] and MFD [μm] is used as a confinement index of light into the cores (note: confinement becomes stronger with decrease of the confinement index, as described below), it is possible to achieve the following at the wavelength of 1.55 μm: when MFD/$(\lambda_{cc})^{0.657}$ is not more than 7.8, $SSE_{lim,core}$ can be not less than 30 times $SSE_{lim,SMF}$; when MFD/$(\lambda_{cc})^{0.657}$ is not more than 6.8, $SSE_{lim,core}$ can be not less than 35 times $SSE_{lim,SMF}$; when MFD/$(\lambda_{cc})^{0.657}$ is not more than 6.0, $SSE_{lim,core}$ can be not less than 40 times $SSE_{lim,SMF}$; when MFD/$(\lambda_{cc})^{0.657}$ is not more than 5.4, $SSE_{lim,core}$ can be not less than 45 times $SSE_{lim,SMF}$. When MFD/$(\lambda_{cth})^{0.720}$ expressed by the theoretical cutoff wavelength $\lambda_{cth}$ [μm] and MFD [μm] is used as a confinement index of light into the cores, it is possible to achieve the following at the wavelength of 1.55 μm: when MFD/$(\lambda_{cth})^{0.720}$ is not more than 6.7, $SSE_{lim,core}$ can be not less than 30 times $SSE_{lim,SMF}$; when MFD/$(\lambda_{cth})^{0.720}$ is not more than 5.9, $SSE_{lim,core}$ can be not less than 35 times $SSE_{lim,SMF}$; when MFD/$(\lambda_{cth})^{0.720}$ is not more than 5.3, $SSE_{lim,core}$ can be not less than 40 times $SSE_{lim,SMF}$; when MFD/$(\lambda_{cth})^{0.720}$ is not more than 4.8, $SSE_{lim,core}$ can be not less than 45 times $SSE_{lim,SMF}$. As long as the cores are arranged on an infinitely-spreading plane, the densest packing can be realized by arranging the cores on a hexagonal lattice. However, there is a limit to the cross section of optical fiber and there are cases where more cores can be arranged in constellations other than the hexagonal lattice constellation.

As the cladding diameter $D_{clad}$ becomes larger, the failure probability of optical fiber increases and the mechanical reliability degrades. Therefore, the cladding diameter $D_{clad}$ needs to be kept not more than a certain level. If the outer cladding thickness OCT, which is the shortest distance between an interface between the cladding and the coating (the outer peripheral surface of the cladding) and the core center, is too small, the transmission losses of cores close to the outer peripheral surface of the cladding will become worse and thus OCT needs to be not less than a certain value. If the shortest neighboring core pitch $d_{min}$, which is the shortest distance between centers of neighboring cores, is small, the crosstalk XT will become worse and the cutoff wavelength will vary; therefore, $d_{min}$ needs to be not less than a certain value.

When the cladding diameter $D_{clad}$, outer cladding thickness OCT, and shortest neighboring core pitch $d_{min}$ are determined in this manner, the problem of core constellation on the assumption of a circular cladding can be handled as a problem of circular packing and we can make use of the fruits of mathematics.

Figure 3:
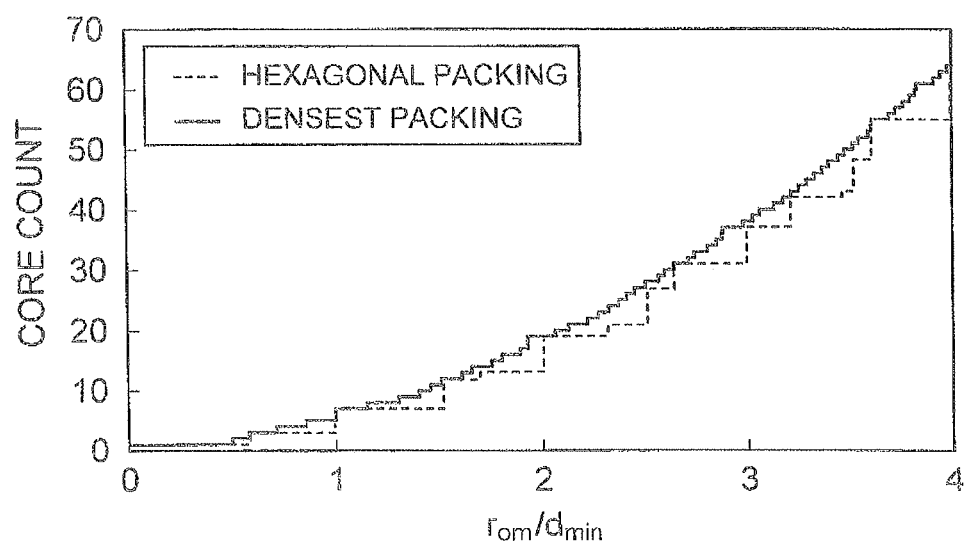
FIG. 3 is a drawing showing a relationship of a maximum arrangeable core count with a value (r$_{om}$/d$_{min}$) obtained by normalizing a distance r$_{om}$ between a center of an outermost core and a fiber center by a minimum neighboring core pitch d$_{min}$.

FIG. 3 is a drawing showing a relationship of a maximum arrangeable core count with a value $(r_{om}/d_{min})$ which is the maximum distance $r_{om}$ between the center of the outermost core and the center of the fiber with the transmission loss increase of the outermost core being within a tolerable range, normalized by the shortest neighboring core pitch $d_{min}$. FIG. 3 shows a case of hexagonal lattice packing (Hexagonal packing) and a case of closest packing (Densest packing) within known limits. It is understood that a small decrease of $d_{min}$ or a small increase of $r_{om}$ can more effectively lead to an increase in the core count in the densest packing case than in the hexagonal packing case.

Figure 4:
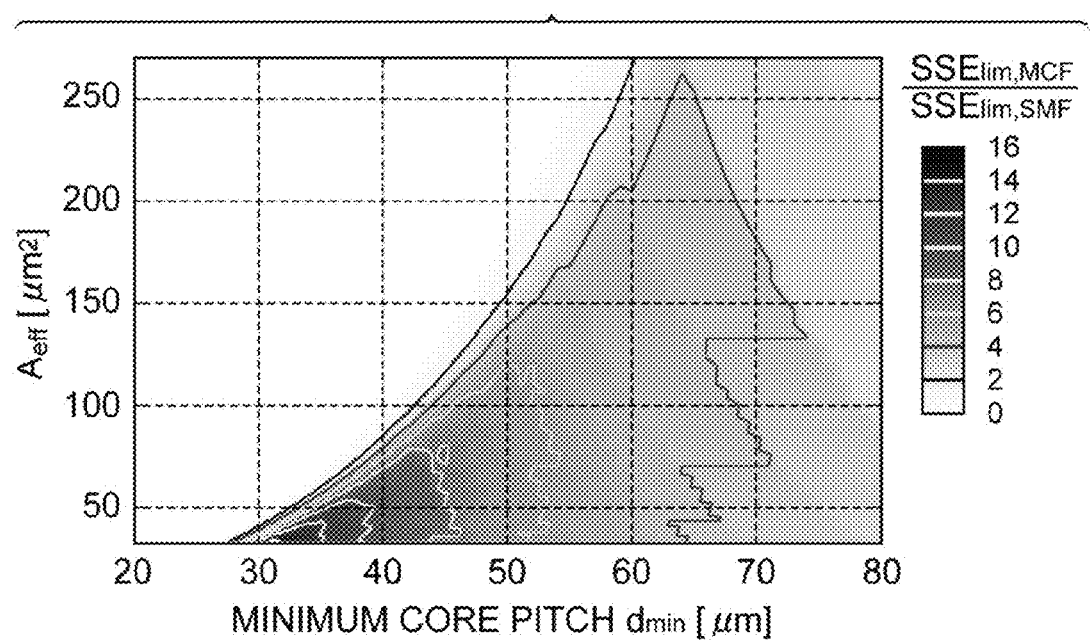
FIG. 4 is a graph showing dependence of a ratio (SSE$_{lim,MCF}$/SSE$_{lim,SMF}$) on the effective cross-sectional area A$_{eff}$ and the core pitch $\Lambda$ of step-index cores.

A permissible maximum of the cladding diameter $D_{clad}$ is believed to be approximately from 200 to 250 μm. Then $SSE_{lim}$ ($SSE_{lim,MCF}$) of the multi-core optical fiber was obtained by calculation while the cladding diameter $D_{clad}$ was assumed to be 225 μm. FIG. 4 is a graph showing dependence of the ratio ($SSE_{lim,MCF}/SSE_{lim,SMF}$) on the effective cross-sectional area $A_{eff}$ and the core pitch Λ of step-index cores. FIG. 4 shows values of the ratio $SSE_{lim,MCF}/SSE_{lim,SMF}$, where $SSE_{lim}$ ($SSE_{lim,SMF}$) of the general-purpose single-mode fiber was also calculated in the same manner as in FIG. 2. Here, $SSE_{lim,MCF}$ was calculated using the coating diameter $D_{coat}$ of 350 μm and the cross-sectional area $A_{cs}=\pi(D_{coat}/2)^2$ and also using the core counts in the densest packing in FIG. 3.

Even if the coating thickness is decreased to make the coating diameter $D_{coat}$ smaller, there will be no change in tendency of magnitude of $SSE_{lim,MCF}$, resulting in overall improvement of $SSE_{lim,MCF}$; therefore, $D_{coat}$ is desirably as small as possible, without causing a problem of micro-bend loss or the like. Concerning the outer cladding thickness OCT, the permissible minimum outer cladding thickness $OCT_{min}$ is defined as a value by which the transmission loss increase of the outermost core is 0.001 dB/km at the wavelength of 1625 nm, and thus $r_{om}$ becomes larger with decrease of the effective cross-sectional area $A_{eff}$. The reason for it is that confinement of light into the cores becomes stronger as $A_{eff}$ becomes smaller. From FIG. 4, we can achieve the following: when $A_{eff}$ is not more than 50 μm² and $d_{min}$ is in the range of 30 to 39 μm, $SSE_{lim,MCF}$ can be not less than 10 times $SSE_{lim,SMF}$.

However, the core constellations by the densest packing different from the hexagonal lattice can have a problem in terms of easiness to manufacture. For manufacturing the multi-core optical fiber, the rod-in-collapse method or the sand cladding method allows core constellations with some freedom. In the stack-and-draw method, however, it is not impossible to stack rods for cores in the constellations other than the hexagonal lattice, but they need to be stacked in complicated combination together with rods for cladding of various diameters, which makes design and actual works very difficult. Concerning peripheral devices of the multi-core optical fiber, there are also the same difficulties as in the forgoing stack-and-draw method, for example, in a situation where fan-out of the multi-core optical fiber is realized by a bundle of a plurality of single-core optical fibers.

Figure 5:
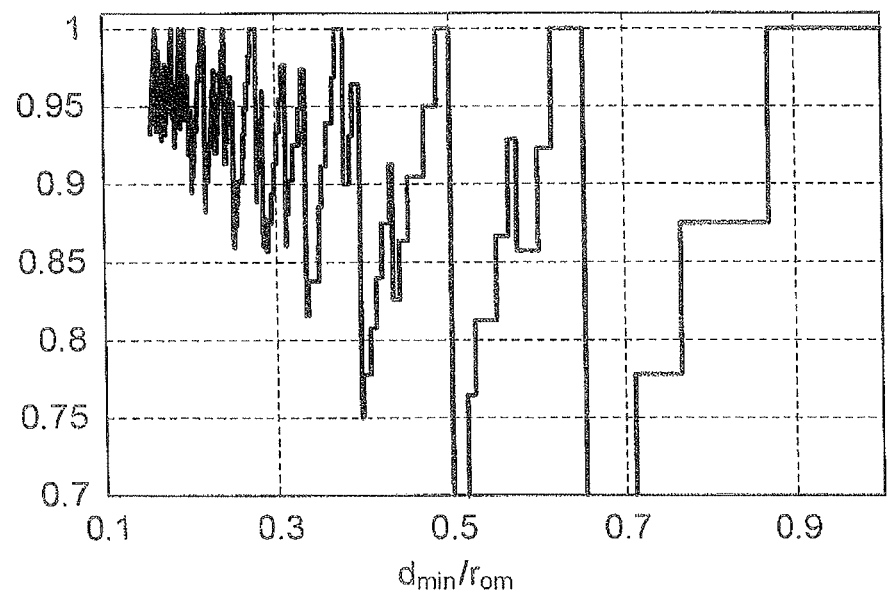
FIG. 5 is a graph showing a relationship of a ratio (d$_{min}$/r$_{om}$) with a core count ratio obtained by dividing a core count in hexagonal packing by a core count in densest packing.

The multi-core optical fibers described below can realize the core counts equivalent to those in the densest packing and high spatial spectral efficiency SSE though they are of the hexagonal lattice core constellations. FIG. 5 is a graph showing a relationship of the ratio $(d_{min}/r_{om})$ with a core count ratio which is a value obtained by dividing the core count in the hexagonal packing by the core count in the densest packing. FIG. 5 was obtained from FIG. 3. It is seen from FIG. 5 that even if the cores are arranged in the hexagonal packing, the core count ratio can be 1 or a value close to 1 in specific ranges of $d_{min}/r_{om}$. It is noted that $d_{min}/r_{om}$ is equal to $\Lambda/(r_{clad}-OCT_{min})$.

FIG. 6 is a table collectively showing the ranges of $d_{min}/r_{om}$ with the core count ratio of 1 and the core counts in the hexagonal packing in the corresponding ranges. FIG. 7 is a table collectively showing the ranges of $d_{min}/r_{om}$ with the core count ratios of not less than 0.95 and the core counts in the hexagonal packing in the corresponding ranges. FIG. 8 is a table collectively showing the ranges of $d_{min}/r_{om}$ with the core count ratios of not less than 0.9 and the core counts in the hexagonal packing in the corresponding ranges. The "core count ratio" is a value obtained by dividing the core count in the hexagonal packing by the core count in the densest packing. However, any continuous range of $d_{min}/r_{om}$ less than 0.005 is omitted. The reason for it is as follows: for example, where $2r_{om}$ is 200 μm, the ratio is converted to the range of 0.5 μm as a range of a maximum and a minimum of it is not always easy to control the core constellation with such accuracy and there is a possibility of degrading manufacturability and yield of the multi-core optical fiber.

Investigation was conducted on specific structures of the multi-core optical fiber capable of realizing the core count ratio of not less than 0.9 and large $SSE_{lim,MCF}$, and they are as described below.

First described is the relationship with the smallest outer cladding thickness OCT which can be permitted from the viewpoint of the transmission loss increase of the outermost core. The normalized outer cladding thickness OCT/λ was introduced herein, thereby finding a relationship independent of the wavelength.

Figure 10A:
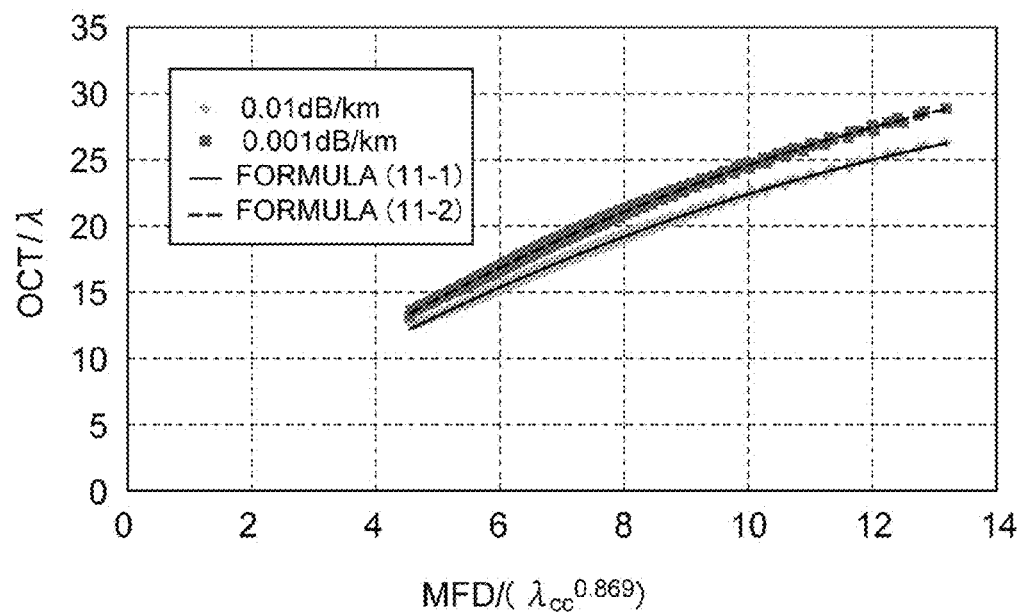
FIGS. 10A and 10B are graphs showing relationships of normalized outer cladding thickness OCT/$\lambda$ with MFD/$(\lambda_{cc})^{0.869}$ in the case of the transmission loss increase of the outermost core being 0.01 dB/km and MFD/$(\lambda_{cth})^{0.703}$ in the case of the transmission loss increase of the outermost core being 0.001 dB/km.
Figure 10B:
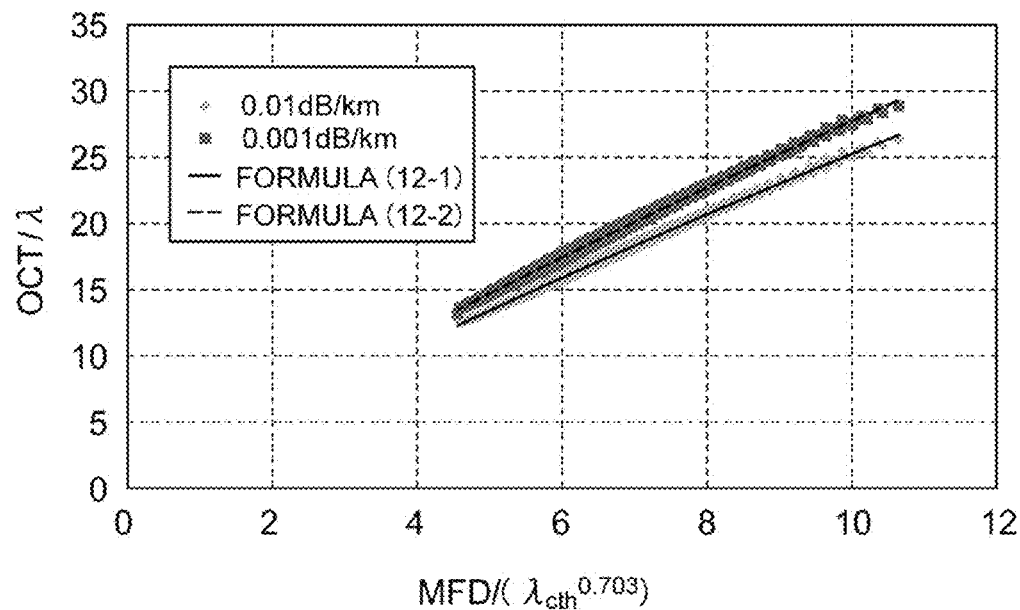

FIGS. 10A and 10B are graphs showing relationships of OCT [μm] with the wavelength [μm] and the cutoff wavelength [μm] and MFD [μm], in the cases where the transmission loss increase of the outermost core is 0.01 dB/km and 0.001 dB/km. FIGS. 10A and 10B include the data at the wavelength 1550 nm and the wavelength 1625 nm in the cases of the cable cutoff wavelengths of 1.26 μm and 1.53 μm. When the cable cutoff wavelength $\lambda_{cc}$ is used as the cutoff wavelength, the relationship of $MFD/(\lambda_{cc})^{0.869}$ with OCT at the transmission loss increase of the outermost core of 0.01 dB/km ($OCT_{0.01\ dB/km}$) is expressed by Formula (11-1) below, and the relationship thereof with OCT at the transmission loss increase of the outermost core of 0.001 dB/km ($OCT_{0.001\ dB/km}$) by Formula (11-2) below. When the cable cutoff wavelength $\lambda_{cth}$ is used as the cutoff wavelength, the relationship of $MFD/(\lambda_{cth})^{0.703}$ with $OCT_{0.01\ dB/km}$ is expressed by Formula (12-1) below and the relationship with $OCT_{0.001\ dB/km}$ by Formula (12-2) below.

These relationships also hold in fibers using trench-assisted cores each of which has a trench layer with the refractive index lower than that of the cladding around the core. When consideration is given to the point that increase in the transmission loss of the outermost core over 0.01 dB/km leads to the transmission loss increase significant in terms of optical characteristic, OCT at the wavelength of 1.625 μm is preferably not less than $OCT_{0.01\ dB/km}$ calculated by Formula (11-1) or Formula (12-1) below and, in order to keep the transmission loss of the outermost core below 0.001 dB/km, OCT at the wavelength of 1.625 μm is preferably not less than $OCT_{0.001\ dB/km}$ calculated by Formula (11-2) or Formula (12-2) below. Or, when $OCT_{min}$ is a value from $OCT_{0.01\ dB/km}$ to $OCT_{0.001\ dB/km}$ ($OCT_{0.001\ dB/km} > OCT_{0.01\ dB/km}$), actual OCT is preferably not less than $OCT_{min}$. In this case, $\Lambda/(r_{clad} - OCT_{min})$ is desirably a value in the range of $d_{min}/r_{om}$ in FIG. 8 according to the core count, more desirably a value in the range of $d_{min}/r_{om}$ in FIG. 7 according to the core count, and more desirably a value in the range of $d_{min}/r_{om}$ in FIG. 6 according to the core count. Particularly, when the core count is as small as 19 or less, the ratio is desirably a value in the range of $d_{min}/r_{om}$ in FIG. 6 in order to increase the core count ratio as high as possible. This can realize a high core count ratio even in the core constellation of the equilateral-triangular lattice pattern, without excess increase in OCT, while suppressing the transmission loss increase of the outermost core.

$$\frac{OCT_{0.01\ dB/km}}{\lambda} = -7.78 \times 10^{-2} \left( \frac{MFD}{(\lambda_{cc})^{0.869}} \right)^2 + 3.02 \left( \frac{MFD}{(\lambda_{cc})^{0.869}} \right) \quad (11\text{-}1)$$

-continued $$\frac{OCT_{0.001\ dB/km}}{\lambda} = -8.48 \times 10^{-2} \left( \frac{MFD}{(\lambda_{cc})^{0.869}} \right)^2 + 3.31 \left( \frac{MFD}{(\lambda_{cc})^{0.869}} \right) \quad (11\text{-}2)$$

$$\frac{OCT_{0.01\ dB/km}}{\lambda} = -2.90 \times 10^{-2} \left( \frac{MFD}{(\lambda_{cth})^{0.703}} \right)^2 + 3.02 \left( \frac{MFD}{(\lambda_{cth})^{0.703}} \right) \quad (12\text{-}1)$$

$$\frac{OCT_{0.001\ dB/km}}{\lambda} = -3.06 \times 10^{-2} \left( \frac{MFD}{(\lambda_{cth})^{0.703}} \right)^2 + 3.08 \left( \frac{MFD}{(\lambda_{cth})^{0.703}} \right) \quad (12\text{-}2)$$

Figure 9:
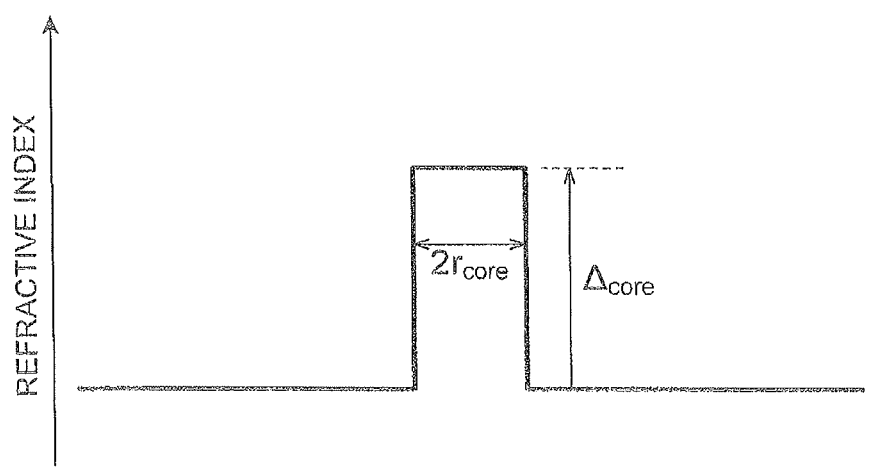
FIG. 9 is a drawing showing a refractive index profile of the step-index type.

The following will describe the minimum neighboring core pitch $d_{min}$ capable of increasing $SSE_{lim,MCF}/SSE_{lim,SMF}$. Here, let us consider the step-index type cores as in the cases of FIG. 2 and FIG. 4. As shown in FIG. 9, let $\Delta_{core}$ be a relative refractive-index difference of the core with respect to the refractive index of the cladding and $2r_{core}$ be the diameter of the core. The refractive index profile of FIG. 9 is a refractive index profile of a neighboring region including one core 10, and shows the refractive indices of respective parts along the line L1 in FIG. 1A. Supposing transmission is done in the C-band and the cable cutoff wavelength $\lambda_{cc}$ is fixed at 1530 nm, if one of the relative refractive-index difference $\Delta_{core}$ and the diameter $2r_{core}$ of the cores is determined, the other will also be uniquely determined. FIG. 11 is a graph showing a relationship of $SSE_{lim,core}$ normalized per $A_{eff}$ with a statistical average of total crosstalk from the other cores ($XT_{total}$). FIG. 11 includes the data with $A_{eff}$ in the range of 30 to 270 μm, $\Delta_{core}$ in the range of 0.18 to 1.0%, the confinement index of light into the cores $MFD/(\lambda_{cc})^{0.657}$ at the wavelength of 1.55 μm in the range of 4.9 to 10.4, and the confinement index of light into the cores $MFD/(\lambda_{cth})^{0.720}$ at the wavelength of 1.55 μm in the range of 4.5 to 13.6. In FIG. 2 $d_{min}$ at maxima of $SSE_{lim,core}$ differs depending upon $A_{eff}$, whereas it is seen in FIG. 11 that $XT_{total}$ at the maxima of $SSE_{lim,core}$ is almost independent of $A_{eff}$ (or the confinement index). From this result, $XT_{total}$ needs to be in a certain range, in order to maximize $SSE_{lim,core}$.

The graph shown in FIG. 11 shows calculated values on the assumption of the total transmission link length of 3200 km, but the neighboring intercore power coupling coefficient at the maximum of $SSE_{lim,core}$ does not have significant dependence on the total transmission link length. Let η be the neighboring intercore power coupling coefficient, let us assume the core constellation of the equilateral-triangular lattice pattern, and let us assume that the total transmission link length is in the range of 80 km to 12000 km. In this situation, in order to maintain $SSE_{lim,MCF}/SSE_{lim,SMF}$ not less than 0.85, the neighboring intercore power coupling coefficient η is preferably from about $3.6 \times 10^{-9}$/km to about $2.3 \times 10^{-6}$/km. In order to maintain $SSE_{lim,MCF}/SSE_{lim,SMF}$ not less than 0.9, the neighboring intercore power coupling coefficient η is preferably from about $1.4 \times 10^{-8}$/km to about $1.7 \times 10^{-6}$/km. In order to maintain $SSE_{lim,MCF}/SSE_{lim,SMF}$ not less than 0.95, the neighboring intercore power coupling coefficient η is preferably from about $5.3 \times 10^{-8}$/km to about $1.1 \times 10^{-6}$/km. The foregoing discussion concerned the case of the multi-core optical fiber comprised of the identical type of cores only, but in the case of the multi-core optical fiber comprised of two or more types of cores wherein neighboring cores are of different types, the neighboring identical intercore power coupling coefficient can be larger than the neighboring intercore power coupling coefficient in some cases. In such cases, both of the neighboring intercore power coupling coefficient and the neighboring identical intercore power coupling coefficient are preferably not more than the maximum of the desired range of η mentioned above, at the wavelength of 1625 nm, and at least either one of the neighboring intercore power coupling coefficient and the neighboring identical intercore power coupling coefficient is preferably not less than the minimum of the desired range of η mentioned above, at the wavelength of 1530 nm.

FIG. 16A is a drawing showing a relationship of neighboring cores in the case where the cores are identical cores only, in the cross section of the multi-core optical fiber 1, and FIG. 16B a drawing showing a relationship of neighboring cores in the case where the cores are multiple types of cores, in the cross section of the multi-core optical fiber 1. In FIGS. 16A and 16B, the cores of the same pattern (shading) are an identical type of cores. It is noted that the "neighboring intercore power coupling coefficient" is originally applied to both of identical cores and different cores. The "neighboring identical intercore power coupling coefficient" means the power coupling coefficient between identical cores at the shortest distance out of the identical cores existing in the multi-core optical fiber 1, as shown in FIG. 16A. The "identical cores at the shortest distance" can be such that cores at the shortest distance are a pair of neighboring cores, but can also embrace a situation in which cores at the shortest distance are not a pair of neighboring cores. In the present specification the term "neighboring identical intercore" means neighboring identical cores, out of the identical cores. Furthermore, the "neighboring different intercore power coupling coefficient" means the power coupling coefficient in the case where neighboring cores are different cores. Whether cores are "different cores" or "identical cores" is determined as follows: "identical cores" are cores with both of the refractive index profile and the outer diameter being identical; whereas, "different cores" are cores with at least one of the refractive index profile and the outer diameter being different.

For making $SSE_{lim,core}$ larger, it is necessary to also set $A_{eff}$ and the relative refractive-index difference of cores in appropriate ranges, as well as η. For keeping $SSE_{lim,core}$ not less than 30 times $SSE_{lim,SMF}$, $A_{eff}$ is desirably not more than 87 μm². For keeping $SSE_{lim,core}$ not less than 35 times $SSE_{lim,SMF}$, $A_{eff}$ is desirably not more than 64 μm². For keeping $SSE_{lim,core}$ not less than 40 times $SSE_{lim,SMF}$, $A_{eff}$ is desirably not more than 50 μm². At the wavelength of 1.55 μm, for keeping $SSE_{lim,core}$ not less than 30 times $SSE_{lim,SMF}$, $MFD/(\lambda_{cc})^{0.657}$ is desirably not more than 7.8. For keeping $SSE_{lim,core}$ not less than 35 times $SSE_{lim,SMF}$, $MFD/(\lambda_{cc})^{0.657}$ is desirably not more than 6.8. For keeping $SSE_{lim,core}$ not less than 40 times $SSE_{lim,SMF}$, $MFD/(\lambda_{cc})^{0.657}$ is desirably not more than 6.0. For keeping $SSE_{lim,core}$ not less than 45 times $SSE_{lim,SMF}$, $MFD/(\lambda_{cc})^{0.657}$ is desirably not more than 5.4. For keeping $SSE_{lim,core}$ not less than 30 times $SSE_{lim,SMF}$, $MFD/(\lambda_{cth})^{0.720}$ is desirably not more than 6.7. For keeping $SSE_{lim,core}$ not less than 35 times $SSE_{lim,SMF}$, $MFD/(\lambda_{cth})^{0.720}$ is desirably not more than 5.9. For keeping $SSE_{lim,core}$ not less than 40 times $SSE_{lim,SMF}$, $MFD/(\lambda_{cth})^{0.720}$ is desirably not more than 5.3. For keeping $SSE_{lim,core}$ not less than 45 times $SSE_{lim,SMF}$, $MFD/(\lambda_{cth})^{0.720}$ is desirably not more than 4.8.

Now, based on Expressions (12) to (15) in Reference literature 1 "M. Koshiba, K. Saitoh, K. Takenaga, and S. Matsuo, "Analytical expression of average power-coupling coefficients for estimating intercore crosstalk in multicore fibers," IEEE Photon. J., vol. 4, no. 5, pp. 1987-1995, October 2012," the power coupling coefficient between neighboring identical cores can be expressed by Formula (13) below. In this formula, κ represents the mode coupling coefficient, R the radius of curvature, β the propagation constant, $\Lambda_{identical}$ the identical core pitch, and $l_c$ the correlation length of intercore phase difference, and $R_{eff}$ will be called an effective radius of curvature as to crosstalk. Since the foregoing Reference Literature 1 reports that $l_c$ becomes about 0.05 m, the effective radius of curvature $R_{eff}$ [m] as to crosstalk can be expressed by Formula (14) below, where the radius of curvature is R [m], the wavelength λ [μm], the effective refractive index $n_{eff}$, and the identical core pitch $\Lambda_{identical}$ in the unit of [μm].

$$\eta = \frac{2\kappa^2 R_{eff}}{\beta \Lambda_{identical}}, \quad R_{eff} = \left[\left(\frac{1}{\beta \Lambda_{identical} l_c}\right)^2 + \frac{1}{R^2}\right]^{-\frac{1}{2}} \quad (13)$$

$$R_{eff,\lambda} = \left\{\left[\frac{\lambda}{2\pi n_{eff} \Lambda_{identical} 0.05}\right]^2 + \frac{1}{R^2}\right\}^{-\frac{1}{2}} \quad (14)$$

When we consider identical step-index type cores, the core pitch $\Lambda_{identical}$ [μm] with which η becomes not less than the lower limit of the foregoing range at the wavelength of 1530 nm and η becomes not more than the upper limit of the foregoing range at the wavelength of 1625 nm is as described below. The identical cores herein are cores the refractive index profiles or effective refractive indices of which are substantially equal. In the actual multi-core optical fiber, when the radius of curvature of the fiber to maximize crosstalk between certain two cores without being affected by bending loss is not less than the radius of curvature in use of the fiber, the two cores can be said to be identical cores.

The relationship among η [/km], $\Lambda_{identical}$ [μm], λ [μm], $\lambda_{cc}$ [μm], $\lambda_{cth}$ [μm], MFD [μm], and $R_{eff}$ [m] was obtained by simulation calculation, using the foregoing Formula (13), and the Inventor discovered as a result of the calculation that the relationship such as Formula (15) or Formula (16) below holds by using as the confinement index of light into the cores, $MFD/(\lambda_{cc})^{0.657}$ expressed by the cable cutoff wavelength $\lambda_{cc}$, and MFD, or, $MFD/(\lambda_{cth})^{0.720}$ expressed by the theoretical cutoff wavelength $\lambda_{cth}$ and MFD.

$$\frac{\Lambda_{identical}}{\lambda} \equiv -2.99 \times 10^{-3} \left(32.1 + \ln R_{eff,\lambda} - \ln \eta \right) \left(\frac{MFD}{(\lambda_{cc})^{0.657}}\right)^2 + \quad (15)$$
$$1.17 \times 10^{-1} \left(26.7 + \ln R_{eff,\lambda} - \ln \eta\right) \left(\frac{MFD}{(\lambda_{cc})^{0.657}}\right)$$

$$\frac{\Lambda_{identical}}{\lambda} \equiv -1.47 \times 10^{-3} \left(44.9 + \ln R_{eff,\lambda} - \ln \eta\right) \left(\frac{MFD}{(\lambda_{cth})^{0.720}}\right)^2 + \quad (16)$$
$$1.18 \times 10^{-1} \left(27.0 + \ln R_{eff,\lambda} - \ln \eta\right) \left(\frac{MFD}{(\lambda_{cth})^{0.720}}\right)$$

From the above Formula (15), preferably, Formula (17) below holds at the wavelength of 1.53 μm and Formula (18) below holds at the wavelength of 1.625 μm; or, from the above Formula (15), preferably, Formula (19) below holds at the wavelength of 1.53 μm and Formula (20) below holds at the wavelength of 1.625 μm. In this regard, for maintaining $SSE_{lim,MCF}/SSE_{lim,max,MCF}$ not less than 0.85, it is preferable that $\eta_{min}=3.6\times10^{-9}$/km and $\eta_{max}=2.3\times10^{-6}$/km; for maintaining $SSE_{lim,MCF}/SSE_{lim,max,MCF}$ not less than 0.9, it is preferable that $\eta_{min}=1.4\times10^{-8}$/km and $\eta_{max}=1.7\times10^{-6}$/km; for maintaining $SSE_{lim,MCF}/SSE_{lim,max,MCF}$ not less than 0.95, it is preferable that $\eta_{min}=5.3\times10^{-8}$/km and $\eta_{max}=1.1\times10^{-6}$/km.

$$\Lambda_{identical} \leq \lambda \left[ -2.99 \times 10^{-3}(32.1 + \ln R_{eff,\lambda} - \ln \eta_{min}) \left( \frac{MFD}{(\lambda_{cc})^{0.657}} \right)^2 + \right. \quad (17)$$

$$\left. 1.17 \times 10^{-1}(26.7 + \ln R_{eff,\lambda} - \ln \eta_{min}) \left( \frac{MFD}{(\lambda_{cc})^{0.657}} \right) \right]$$

$$\Lambda_{identical} \geq \lambda \left[ -2.99 \times 10^{-3}(32.1 + \ln R_{eff,\lambda} - \ln \eta_{max}) \left( \frac{MFD}{(\lambda_{cc})^{0.657}} \right)^2 + \right. \quad (18)$$

$$\left. 1.17 \times 10^{-1}(26.7 + \ln R_{eff,\lambda} - \ln \eta_{max}) \left( \frac{MFD}{(\lambda_{cc})^{0.657}} \right) \right]$$

$$\Lambda_{identical} \leq \lambda \left[ -1.47 \times 10^{-3}(44.9 + \ln R_{eff,\lambda} - \ln \eta_{min}) \left( \frac{MFD}{(\lambda_{cth})^{0.720}} \right)^2 + \right. \quad (19)$$

$$\left. 1.18 \times 10^{-1}(27.0 + \ln R_{eff,\lambda} - \ln \eta_{min}) \left( \frac{MFD}{(\lambda_{cth})^{0.720}} \right) \right]$$

$$\Lambda_{identical} \geq \lambda \left[ -1.47 \times 10^{-3}(44.9 + \ln R_{eff,\lambda} - \ln \eta_{max}) \left( \frac{MFD}{(\lambda_{cth})^{0.720}} \right)^2 + \right. \quad (20)$$

$$\left. 1.18 \times 10^{-1}(27.0 + \ln R_{eff,\lambda} - \ln \eta_{max}) \left( \frac{MFD}{(\lambda_{cth})^{0.720}} \right) \right]$$

In the multi-core optical fiber wherein the neighboring cores are identical cores, the relation of $\Lambda=\Lambda_{identical}$ holds. The multi-core optical fiber comprised of only identical cores is desirable because it is easy to manage inventories of the core material and yields in manufacture and it becomes easier to manage optical characteristics of transmission links after laid.

In the multi-core optical fiber comprised of only identical cores, where the cladding diameter is assumed to be not more than 250 μm, it is desirable for the core count to be 19 while satisfying FIG. 8, that at the wavelength of 1.55 μm, $MFD/(\lambda_{cc})^{0.657}$ be not more than 8.2 or $MFD/(\lambda_{cth})^{0.720}$ be not more than 6.9. Similarly, when each desired relationship among the core count, the upper limit of $MFD/(\lambda_{cc})^{0.657}$, and the upper limit of $MFD/(\lambda_{cth})^{0.720}$ with variation of the core count between 27 and 55 is expressed in the form of [the core count, the upper limit of $MFD/(\lambda_{cc})^{0.657}$, and the upper limit of $MFD/(\lambda_{cth})^{0.720}$], it can be one of [27, 6.4, 5.6], [31, 6.1, 6.4], [37, 5.4, 4.8], [42, 5.1, 4.6], [48, 4.7, 4.2], and [55, 4.6, 4.1].

In the multi-core optical fiber wherein neighboring cores are different cores, $\Lambda$ is an integral division of $\Lambda_{identical}$. In the multi-core optical fiber comprised of three types of cores, it is possible to arrange all neighboring cores of different cores and make $\Lambda$ equal to $1/3^{1/2}$ of $\Lambda_{identical}$. In the multi-core optical fiber comprised of four types of cores, it is possible to arrange all neighboring cores of different cores and make $\Lambda$ equal to $1/2$ of $\Lambda_{identical}$. In the multi-core optical fiber comprised of seven types of cores, it is possible to arrange all neighboring cores of different cores and make $\Lambda$ equal to $1/7^{1/2}$ of $\Lambda_{identical}$. In the multi-core optical fiber comprised of nine types of cores, it is possible to arrange all neighboring cores of different cores and make $\Lambda$ equal to $1/3$ of $\Lambda_{identical}$. The multi-core optical fiber wherein neighboring cores are different cores requires complicated inventory management of the core material and yield management in manufacture and also requires complicated management of optical characteristics of transmission links after laid, but it is preferred in terms of increase in SSE because the core pitch can be decreased without significant increase of crosstalk.

It is known as described in the aforementioned Patent Literature 1 and the aforementioned Non Patent Literature 1 that the crosstalk between different cores becomes suddenly worse with decrease in the radius of curvature. The radius of curvature as a threshold, $R_{pk}$, is expressed by Formula (21) below. In this formula, D represents the distance between centers of different cores, $\langle n_{eff} \rangle$ an average effective refractive index between different cores, and $\Delta n_{eff}$ an effective refractive index difference between different cores.

$$R_{pk} = D \frac{\langle n_{eff} \rangle}{\Delta n_{eff}} \quad (21)$$

For suppressing degradation of crosstalk between different cores, $R_{pk}$ is desirably less than 0.3 m, more desirably not more than 0.2 m, and more desirably not more than 0.1 m, between all neighboring cores. Or, the radius of curvature at maximum crosstalk is desirably less than 0.3 m, more desirably not more than 0.2 m, and more desirably not more than 0.1 m, between all neighboring cores.

By increasing the effective refractive index difference $\Delta n_{eff}$ between cores, $R_{pk}$, or, the radius of curvature at maximum crosstalk between different cores can be made smaller. The effective refractive index difference $\Delta n_{eff}$ may be made by giving a difference of the core diameter or $\Delta_{core}$ between different cores. For suppressing the difference in optical characteristics made between different cores, it is more desirable to make the effective refractive index difference $\Delta n_{eff}$ by giving the difference to optical claddings as claddings around the cores.

The optical claddings are cladding portions around the cores. A preform for the multi-core optical fiber can be manufactured by inserting rods as many as the cores including the optical claddings as well, into respective holes of one jacket rod perforated by the number of cores, and heating them to form an integrated body. In another method, a preform for the multi-core optical fiber can be manufactured by stacking rods as many as the cores including the optical claddings as well, inserting the rods together into a jacket pipe with one hole, and heating them to form an integrated body. In another method, a preform for the multi-core optical fiber can be manufactured by arranging or stacking rods as many as the cores including the optical claddings as well, in the equilateral-triangular lattice pattern, inserting the rods together into a jacket pipe with one hole, filling the gap between the pipe and the core rods with silica glass, and then heating them to form an integrated body. The cladding outside the optical claddings will be called a jacket herein.

The refractive indices of the optical claddings may be equal to the refractive index of the jacket or may not be equal to the refractive index of the jacket. The jacket may be present or absent between the optical claddings. The optical claddings may be in direct contact with each other. The refractive indices of all the optical claddings may be lower than the refractive index of the jacket or the refractive indices of all the optical claddings may be higher than the refractive index of the jacket.

Figure 13:
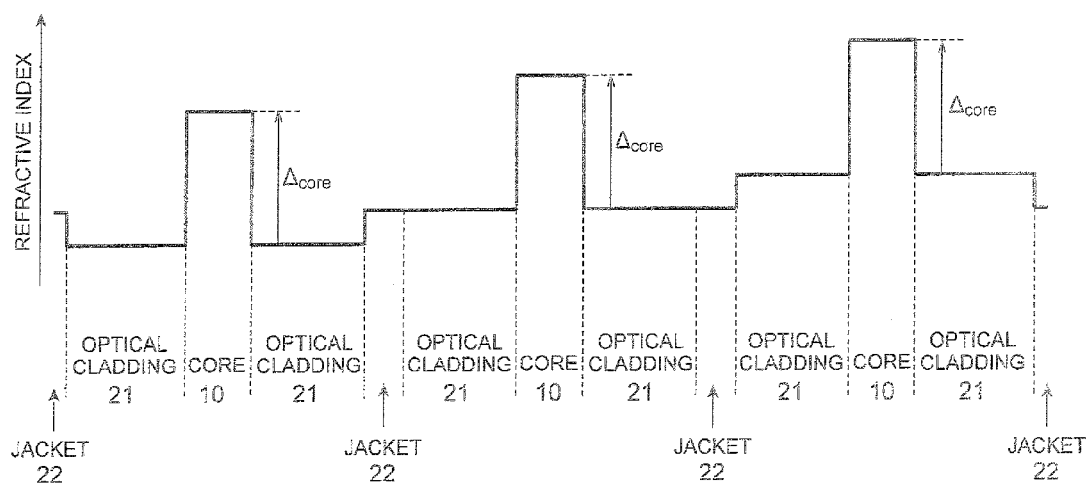
FIG. 13 is a refractive index profile of the multi-core optical fiber 1A along a line L1A in FIG. 12.

FIG. 12 is a drawing showing the cross section of the multi-core optical fiber 1A. FIG. 13 is a refractive index profile of the multi-core optical fiber 1A and shows the refractive indices of respective parts along a center line L1A in FIG. 12. In the example of the multi-core optical fiber 1A shown in these FIG. 12 and FIG. 13, the optical claddings 21 located respectively around seven cores 10 have the refractive indices different from each other, and the jacket 22 is arranged between the optical claddings 21.

Figure 14:
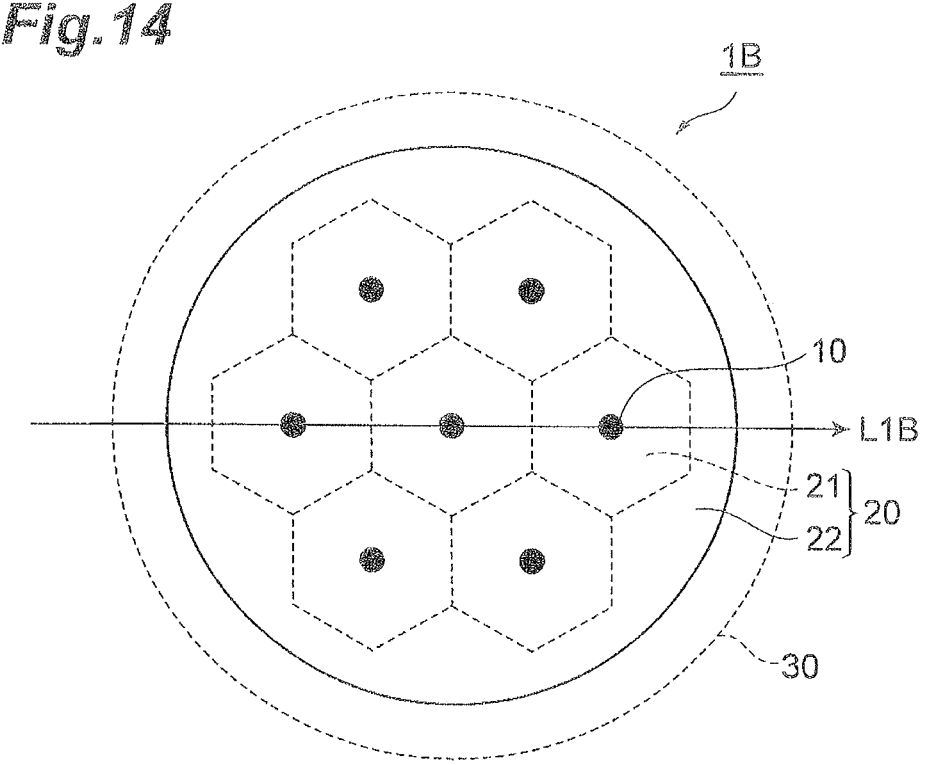
FIG. 14 is a drawing showing a cross section of a multi-core optical fiber 1B.
Figure 15:
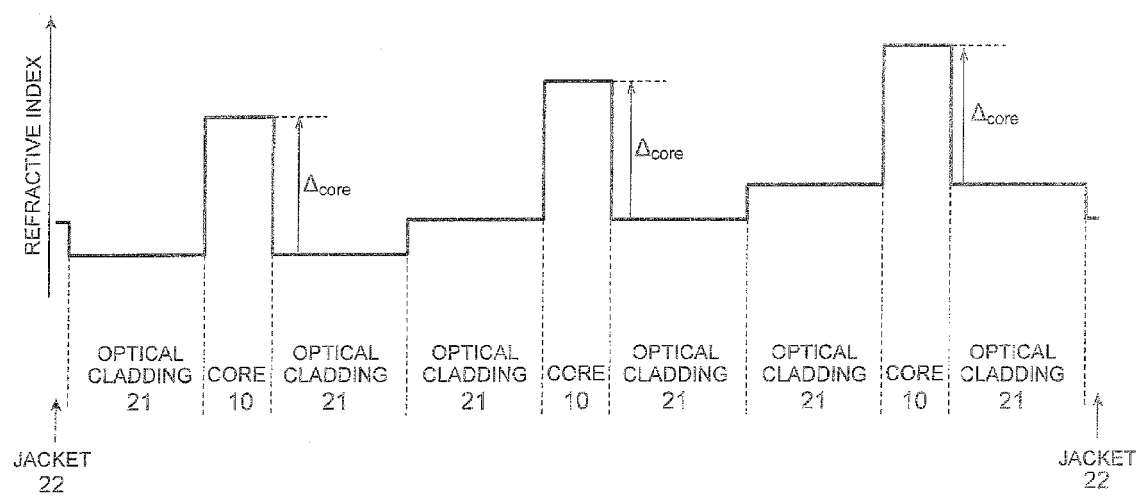
FIG. 15 is a refractive index profile of the multi-core optical fiber 1B along a line L1B in FIG. 14.

FIG. 14 is a drawing showing the cross section of the multi-core optical fiber 1B. FIG. 15 is a refractive index profile of the multi-core optical fiber 1B and shows the refractive indices of respective parts along a center line L1B in FIG. 14. In the example of the multi-core optical fiber 1B shown in these FIG. 14 and FIG. 15, the optical claddings 21 located respectively around seven cores 10 have the refractive indices different from each other, and the jacket 22 is absent between the optical claddings 21.

REFERENCE SIGNS LIST 1, 1A, 1B multi-core optical fiber; 10 core; 20 cladding (common cladding); 21 optical cladding; and 22 jacket.

The invention claimed is:

1. A multi-core optical fiber comprising: a plurality of cores each extending along a central axis and comprised of silica-based glass; a common cladding covering each of the plurality of cores and comprised of silica glass; and a coating provided on an outer peripheral surface of the common cladding and comprised of a material different from silica glass,
wherein in a cross section of the multi-core optical fiber perpendicular to the central axis, the plurality of cores are arranged in an equilateral-triangular lattice pattern and a neighboring core pitch Λ [μm] being a distance between centers of neighboring cores is constant,
wherein a cable cutoff wavelength $\lambda_{cc}$ [μm] of each of the plurality of cores is not more than 1.53 μm,
wherein when a theoretical cutoff wavelength is represented by $\lambda_{cth}$ [μm] and a mode field diameter by MFD [μm], $MFD/(\lambda_{cc})^{0.657}$ as a confinement index of light into each of the plurality of cores is not more than 8.2 at the wavelength of 1.55 μm, or, $MFD/(\lambda_{cth})^{0.720}$ as a confinement index of light into each of the plurality of cores is not more than 6.9 at the wavelength of 1.55 μm,
wherein an outer diameter $2r_{clad}$ [μm] of the common cladding is from 115 μm to 250 μm,
wherein when the multi-core optical fiber is bent in a radius of curvature R in the range of 0.3 m to 3 m over the entire length thereof, both of a neighboring intercore power coupling coefficient and a neighboring identical intercore power coupling coefficient are not more than $2.3 \times 10^{-6}$/km at the wavelength of 1625 nm and at least either one of the neighboring intercore power coupling coefficient and the neighboring identical intercore power coupling coefficient is not less than $3.6 \times 10^{9}$/km at the wavelength of 1530 nm,
wherein when OCT represents a shortest distance from a center of a core located at an outermost periphery out of the plurality of cores, to an outer peripheral surface of the common cladding, $OCT_{0.01\ dB/km}$ [μm] by which a transmission loss increase in the coating theoretically becomes 0.01 dB/km and $OCT_{0.001\ dB/km}$ [μm] by which the transmission loss increase in the coating theoretically becomes 0.001 dB/km, are values obtained by Formula (1) or Formula (2) below using MFD [μm] at the wavelength of 1625 μm, $$\begin{cases} OCT_{0.01\ dB/km} = 1.625\left[-7.78 \times 10^{-2}\left(\frac{MFD}{(\lambda_{bc})^{0.869}}\right)^2 + 3.02\left(\frac{MFD}{(\lambda_{bc})^{0.869}}\right)\right] \\ OCT_{0.001\ dB/km} = 1.625\left[-8.48 \times 10^{-2}\left(\frac{MFD}{(\lambda_{cc})^{0.869}}\right)^2 + 3.31\left(\frac{MFD}{(\lambda_{cc})^{0.869}}\right)\right] \end{cases} \quad (1)$$

$$\begin{cases} OCT_{0.01\ dB/km} = 1.625\left[-2.90 \times 10^{-2}\left(\frac{MFD}{(\lambda_{cth})^{0.703}}\right)^2 + 2.81\left(\frac{MFD}{(\lambda_{cth})^{0.703}}\right)\right] \\ OCT_{0.001\ dB/km} = 1.625\left[-3.06 \times 10^{-2}\left(\frac{MFD}{(\lambda_{cth})^{0.703}}\right)^2 + 3.08\left(\frac{MFD}{(\lambda_{cth})^{0.703}}\right)\right] \end{cases} \quad (2)$$

wherein when permissible minimum OCT is represented by $OCT_{min}$, the $OCT_{min}$ is a value from $OCT_{0.01\ dB/km}$ to $OCT_{0.001\ dB/km}$ and actual OCT is not less than $OCT_{min}$,
wherein with a definition of a parameter represented by a formula of $\Lambda(r_{clad}-OCT_{min})$ which is a ratio of the neighboring core pitch Λ to a core-arrangeable radius of the common cladding, a relationship of [a core count:a minimum of the parameter:a maximum of the parameter] is one of [19:0.450:0.500], [27:0.378:0.397], [31:0.351:0.378], [37:0.315:0.333], [42:0.297:0.311], [48:0.278:0.285], [55:0.255:0.277], [63:0.240:0.248], [69:0.229:0.240], [73:0.222:0.229], [85:0.203:0.218], [102:0.189:0.195], [109:0.182:0.189], [121:0.173:0.180], and [151:0.154:0.160].

2. The multi-core optical fiber according to claim 1, wherein when the multi-core optical fiber is bent in the radius of curvature R in the range of 0.3 m to 3 m over the entire length thereof, both of a neighboring different intercore power coupling coefficient and the neighboring identical intercore power coupling coefficient are not more than $1.1 \times 10^{6}$/km at the wavelength of 1625 nm and at least either one of the neighboring different intercore power coupling coefficient and the neighboring identical intercore power coupling coefficient is not less than $5.3 \times 10^{8}$/km at the wavelength of 1530 nm.

3. The multi-core optical fiber according to claim 1, wherein pairs of neighboring cores among the plurality of cores include a pair of identical cores,
wherein in a use condition that an average along a longitudinal direction of the multi-core optical fiber, of the radius of curvature R [m] thereof is not less than 0.3 m, when the wavelength is represented by λ [μm], an effective refractive index is represented by $n_{eff}$, a core pitch between neighboring identical cores is represented by $\Lambda_{identical}$ [μm], a minimum $\eta_{min}$ of the effective refractive index $n_{eff}$ is $3.6 \times 10^{-9}$/km, a maximum $\eta_{max}$ of the effective refractive index $n_{eff}$ is $2.3 \times 10^{-6}$/km, and an effective radius of curvature $R_{eff,\lambda}$ is defined by Formula (3) below, the $\Lambda_{identical}$ [μm] satisfies a first condition that $\Lambda_{identical}$ [μm] satisfies Formula (4) below at λ=1.53 μm and satisfies Formula (5) below at λ=1.625 μm, or, a second condition that $\Lambda_{identical}$ [μm] satisfies Formula (6) below at λ=1.53 μm and satisfies Formula (7) below at λ=1.625 μm.

$$R_{eff,\lambda} = \left\{\left[\frac{\lambda}{2\pi n_{eff}\Lambda_{identical}0.05}\right]^2 + \frac{1}{R^2}\right\}^{-\frac{1}{2}} \quad (3)$$

$$\Lambda_{identical} \leq \lambda\left[-2.99 \times 10^{-3}(32.1 + \ln R_{eff,\lambda} - \ln \eta_{min})\left(\frac{MFD}{(\lambda_{cth})^{0.657}}\right)^2 + 1.17 \times 10^{-1}(26.7 + \ln R_{eff,\lambda} - \ln \eta_{min})\left(\frac{MFD}{(\lambda_{cth})^{0.657}}\right)\right] \quad (4)$$

$$\Lambda_{identical} \geq \lambda\left[-2.99 \times 10^{-3}(32.1 + \ln R_{eff,\lambda} - \ln \eta_{max})\left(\frac{MFD}{(\lambda_{cth})^{0.657}}\right)^2 + 1.17 \times 10^{-1}(26.7 + \ln R_{eff,\lambda} - \ln \eta_{max})\left(\frac{MFD}{(\lambda_{cth})^{0.657}}\right)\right] \quad (5)$$

$$\Lambda_{identical} \leq \lambda\left[-1.47 \times 10^{-3}(44.9 + \ln R_{eff,\lambda} - \ln \eta_{min})\left(\frac{MFD}{(\lambda_{cth})^{0.720}}\right)^2 + 1.18 \times 10^{-1}(27.0 + \ln R_{eff,\lambda} - \ln \eta_{min})\left(\frac{MFD}{(\lambda_{cth})^{0.720}}\right)\right] \quad (6)$$

-continued $$\Lambda_{identical} \geq \lambda \left[ -1.47 \times 10^{-3} (44.9 + \ln R_{eff,\lambda} - \ln \eta_{max}) \left( \frac{MFD}{(\lambda_{cth})^{0.720}} \right)^2 + \right.$$
$$\left. 1.18 \times 10^{-1} (27.0 + \ln R_{eff,\lambda} - \ln \eta_{max}) \left( \frac{MFD}{(\lambda_{cth})^{0.720}} \right) \right] \quad (7)$$

4. The multi-core optical fiber according to claim 3, wherein all the plurality of cores are identical cores.

5. The multi-core optical fiber according to claim 4, wherein when at the wavelength of 1.55 μm a desired relationship among the core count, an upper limit of MFD/$(\lambda_{cc})^{0.657}$, and an upper limit of MFD/$(\lambda_{cth})^{0.720}$ with variation of the core count between 27 and 55 is described in the form of [the core count, the upper limit of MFD/$(\lambda_{cc})^{0.657}$, and the upper limit of MFD/$(\lambda_{cth})^{0.720}$], [the core count, the upper limit of MFD/$(\lambda_{cc})^{0.657}$, and the upper limit of MFD/$(\lambda_{cth})^{0.720}$] is one of [27, 6.4, 5.6], [31, 6.1, 5.4], [37, 5.4, 4.8], [42, 5.1, 4.6], [48, 4.7, 4.2], and [55, 4.6, 4.1].

6. The multi-core optical fiber according to claim 3, wherein the common cladding includes a plurality of optical claddings each of which is a region in contact with a corresponding core out of the plurality of cores and contributes to propagation of light in the corresponding core, wherein pairs of neighboring cores among the plurality of cores include one or more pairs of neighboring different cores comprised of different cores different in at least one of a core diameter, a relative refractive-index difference between the core and the optical cladding, and a refractive index of the optical cladding, and wherein a core pitch between the neighboring different cores is smaller than the core pitch $\Lambda_{identical}$ between the neighboring identical cores.

7. The multi-core optical fiber according to claim 6, wherein the radius of curvature R of a bend of the multi-core optical fiber with which crosstalk between neighboring different cores becomes maximum among all the pairs of neighboring different cores is less than 0.3 m.

8. A multi-core optical fiber cable comprising the multi-core optical fiber according to claim 1, wherein the multi-core optical fiber is incorporated in a state in which an average of the radius of curvature R along the longitudinal direction thereof is maintained not less than 0.3 m.

9. The multi-core optical fiber cable according to claim 8, wherein the multi-core optical fiber is incorporated in a state in which the average of the radius of curvature R along the longitudinal direction thereof is maintained not more than 3 m.

* * * * *